United States Patent [19]
Johnson

[11] 3,958,257
[45] May 18, 1976

[54] COMPACT REFLEX BOX CAMERA

[75] Inventor: Bruce K. Johnson, Andover, Mass.

[73] Assignee: Polaroid Corporation, Cambridge, Mass.

[22] Filed: Aug. 30, 1974

[21] Appl. No.: 501,871

[52] U.S. Cl. .................................. 354/83; 354/155
[51] Int. Cl.² ..................... G03B 17/50; G03B 19/12
[58] Field of Search ......... 354/154, 155, 225, 83–86

[56] References Cited
UNITED STATES PATENTS

| | | | |
|---|---|---|---|
| 2,284,562 | 5/1942 | Dittmann | 354/225 |
| 2,512,772 | 6/1950 | Haeseller | 354/155 |
| 3,608,456 | 9/1971 | Hauser | 354/154 |

Primary Examiner—John F. Gonzales
Attorney, Agent, or Firm—Edward S. Roman

[57] ABSTRACT

A photographic camera apparatus of the non-collapsible type suitable for use with self-developing film units is additionally provided with a single lens reflex capability for through the lens viewing and focusing. The physical size of the non-collapsible camera apparatus is minimized by providing a compact spacing between the various camera components. Toward this end, the camera viewfinder is arranged to define a folded optical axis which lies on a plane substantially parallel to the camera film plane. In addition the camera includes a reflex reflecting component which is arranged to pivot about an axis parallel to the film plane and viewfinder thus providing a compact side-by-side relationship between the viewfinder, reflex member and film plane. Also, the viewfinder, film plane and reflex member are all arranged in substantially orthogonal relationship to the base portion of the camera apparatus housing in order to further compact the spatial distances between these camera components.

19 Claims, 4 Drawing Figures

COMPACT REFLEX BOX CAMERA

BACKGROUND OF THE INVENTION

1. Field of the Invention

This invention relates to photographic apparatus and more particularly to non-collapsible photographic camera apparatus of the single lens reflex type.

2. Description of the Prior Art

Thin and compact collapsible photographic cameras of the reflex type have been developed wherein the exposure of the film unit is electronically controlled and the film unit may be rapidly processed at a processing station within the photographic camera. A version of such a camera having a compactness and thinness during the collapsed mode suited to permit convenient carrying in the pocket of a garment is described in a U.S. Patent entitled "Reflex Camera" by E. H. Land, No. 3,672,281. Such cameras are of the single lens reflex variety and require a complex exposure control system in order to accommodate a requisite viewing and focusing mode during which time the single lens reflex camera is in a normally open status to unblock the passage of light through the exposure opening to a viewfinder. At the commencement of an exposure cycle, the shutter mechanism of the camera exposure control system is driven into a closed or light-blocking orientation whereupon the photographic camera is automatically operated to change from the viewing and focusing mode to an exposure mode in which photosensitive film is made accessible to the optical path of the taking lens of the camera. When the camera has assumed the exposure mode of operation, the exposure control system operates to release a shutter mechanism from its light-blocking orientation wherein such exposure control parameters as exposure interval and aperture size are controlled as a function of scene brightness as evaluated with respect to the sensitometric characteristic of the film being exposed. At the termination of the electronically determined exposure interval the shutter is again driven to a fully closed or light-blocking position to terminate exposure until such time as the camera reassumes the viewing and focusing mode.

Single reflex photographic cameras of the above-described type are suitable for use with film units described in detail in U.S. Patent to E. H. Land No. 3,415,644 entitled "Novel Photographic Products and Processes". Such film units include all the materials necessary to produce a positive photographic print by an image forming process which is now well known in the art and involves the formation of transverse image forming substances in an exposed photosensitive element by their diffusion in a manner forming a visual positive image.

Cameras of the above-described type generally embody a collapsible bellows together with a plurality of precisely articulated components all of which tend to increase manufacturing and assembly costs. Photographic cameras of the non-collapsible type suitable for use with self-developing film are sold commercially, however, such cameras are not of the single lens reflex variety and thus do not permit the camera user to select the exact subject matter of the scene to be photographed nor can the scene image be exactly focused for optimum sharpness. Non-collapsible cameras of the above-described type have also not been sold commercially for use with film units as described in U.S. Pat. No. 3,415,644, supra.

Therefore, it is a primary object of this invention to provide a photographic camera apparatus of the non-collapsible type which is suitable for use with film units of the type described in U.S. Pat. No. 3,415,644, supra.

It is also an object of this invention to provide a single lens reflex photographic camera apparatus of the non-collapsible type suitable for use with film units of the self-developing type.

It is another object of this invention to provide a non-collapsible, single lens reflex, photographic camera apparatus suitable for use with self-developing film wherein the sizes of the optical elements making up the camera viewfinder are minimized in order to compact the overall size of the non-collapsible camera.

It is a further object of this invention to provide a non-collapsible, single lens reflex camera of a type suitable for use with self-developing film whereby individual film units may be ejected from the camera in a manner that reduces the risk than an ejecting film unit will be obstructed by the camera users hand.

It is an even further object of this invention to provide a non-collapsible, single lens reflex, photographic camera apparatus of a type suitable for use with self-developing film units where the spatial orientations of various camera components such as the viewfinder and film plane have been arranged to provide a compact side-by-side relationship.

It is an additional object of this invention to provide a non-collapsible, single lens reflex, photographic camera apparatus of the type suitable for use with self-developing film wherein the camera apparatus may accommodate receipt of flash units for artificial illumination at a sufficient distance above the camera lens to avoid the problems of red eye, grotesque shadowing and the like.

Other objects of the invention will in part be obvious and will in part appear hereinafter.

SUMMARY OF THE INVENTION

The photographic camera apparatus of this invention is preferably of the single lens reflex type comprising a non-collapsible housing within which is disposed an objective lens for admitting scene light into the housing. The camera housing additionally includes means for defining a film plane together with viewfinder means for viewing scene light through the objective lens wherein the optical axis for the scene light is folded in a manner to define a viewing plane substantially parallel to the film plane. There is also included reflecting means which are selectively operative to direct the scene light into impingement on the film plane during an exposure mode of operation for the camera apparatus.

The photographic camera apparatus of this invention preferably has distinct viewing and film exposing modes of operation wherein the reflecting means operates to block a light admitting opening to a light-tight chamber thus prohibiting impingement of scene light onto the film plane during the viewing mode of operation. Reflecting means may include a substantially planar reflecting surface arranged to pivot about an axis orthogonal to the base portion and parallel to the film and viewing planes. Scene light admitted into the housing through the objective lens is centered about an optical axis through the objective lens and the film plane is arranged to be substantially parallel to the optical axis through the objective lens.

In one illustrated arrangement, the non-collapsible housing has a substantially planar base portion wherein the film plane is arranged to be substantially orthogonal to the base portion to permit ejection of individual film units through the top portion of the camera. The viewing means may also include a reducing lens connected for movement with the reflecting means in order to directly intercept scene light passing through the objective lens when the photographic apparatus is in the viewing mode. A focusing screen is then positioned behind the reducing lens in order that a real image of the scene light can be formed on the focusing screen surface. Means are also provided for directing the scene light from the real image to an eye lens whereby the scene light encounters a folded optical path, the plane of which remains substantially parallel to the film plane. In this manner the size of the non-collapsible camera apparatus may be minimzed as a direct result of the spatial orientations of the various camera components as for instance the above-described side-by-side relationships provided between the viewfinder, reflecting means and film plane.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will best be understood from the following description of the illustrated embodiment when read in conjunction with the accompanying drawings wherein like numbers have been employed in the different figures to denote the same parts and wherein;

DESCRIPTION OF THE PREFERRED EMBODIMENTS

Figure 1:
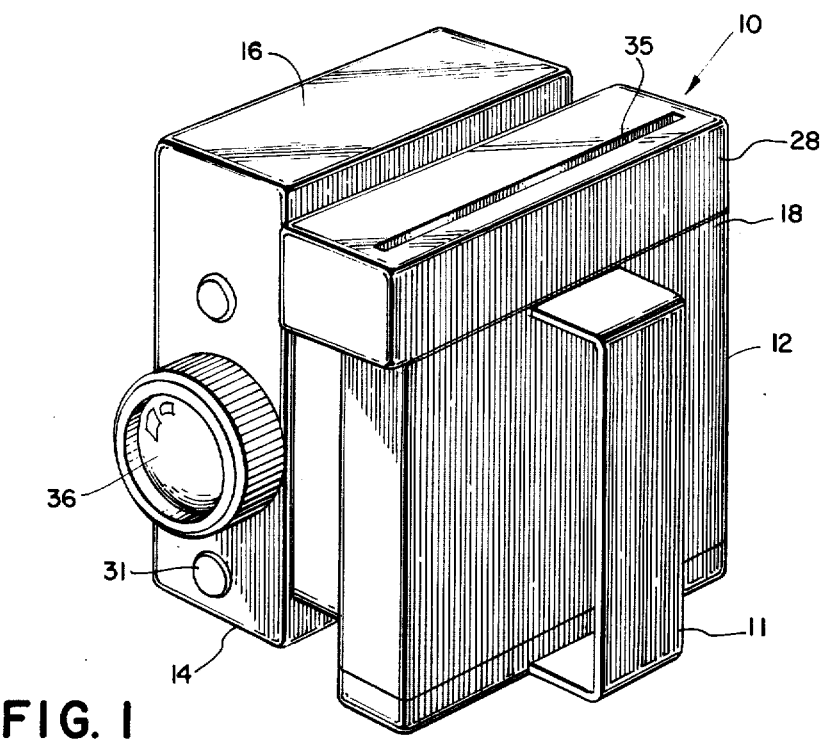
FIG. 1 is a perspective view showing the photographic camera apparatus of this invention.
Figure 2:
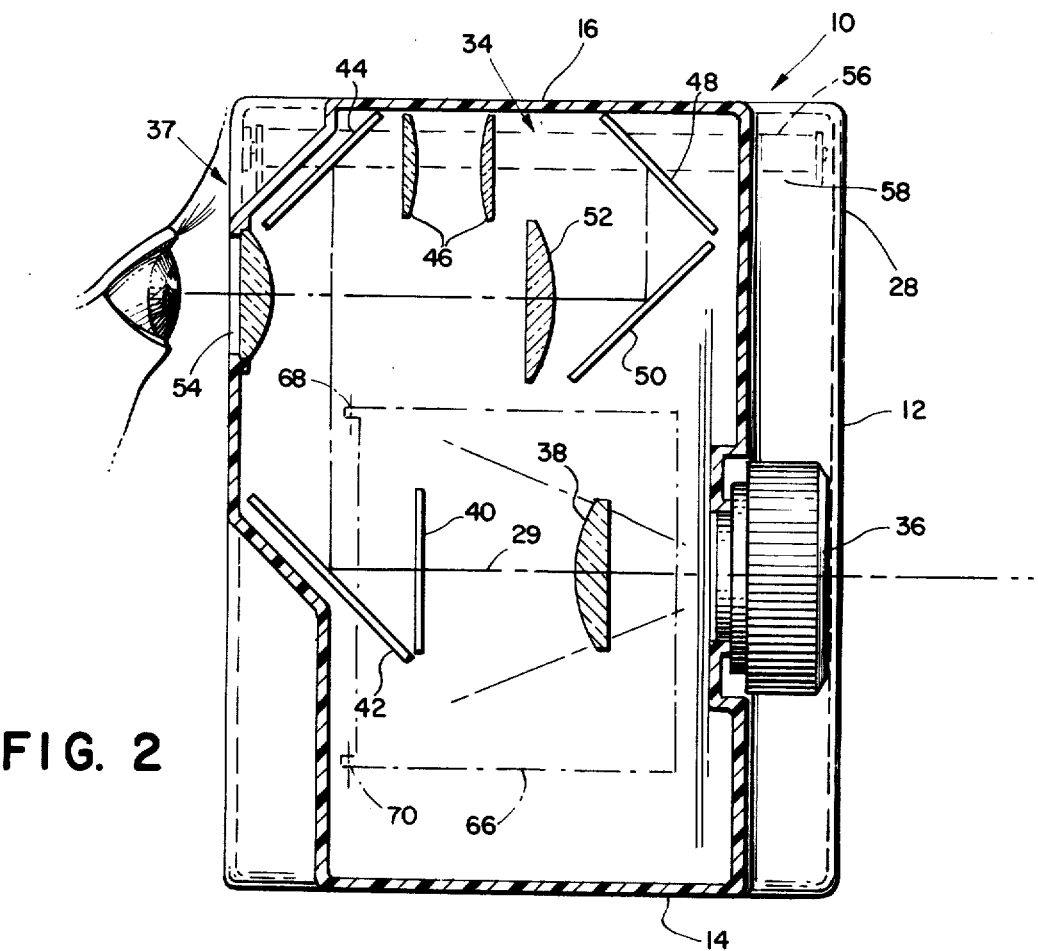
FIG. 2 is a cross-sectional side elevation of the photographic camera apparatus of FIG. 1.
Figure 3:
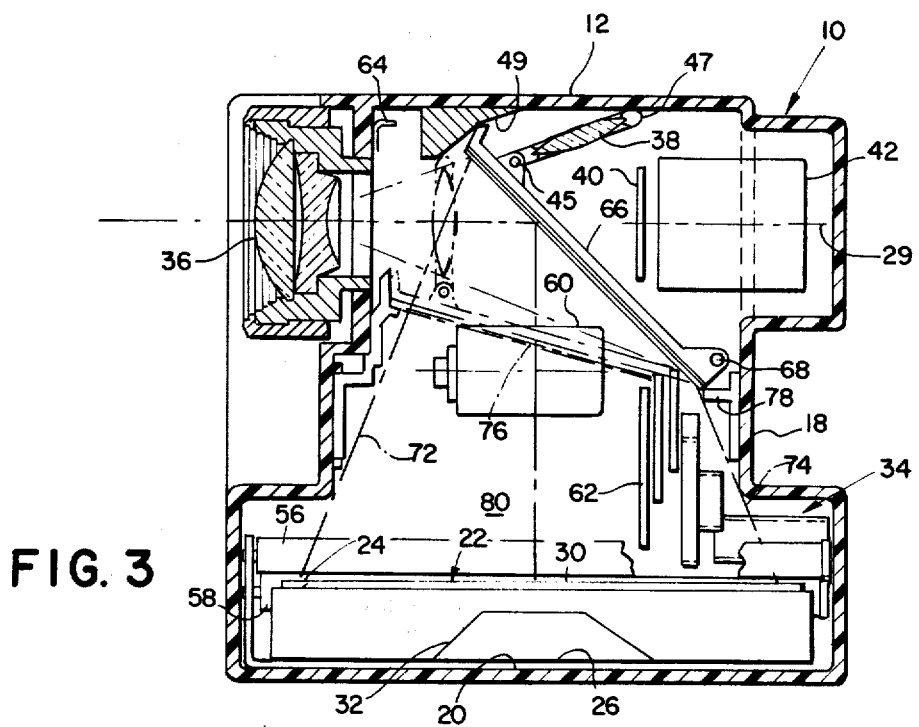
FIG. 3 is a cross-sectional plan view of the photographic camera apparatus of FIG. 1.

Referring to FIGS. 1 and 2, there is shown a photographic camera apparatus 10 of the single lens reflex variety having a non-collapsible housing 12, the base or bottom portion of which is shown generally at 14 as comprising substantially planar sections integrally connected to a substantially planar top portion 16 by longitudinal side wall portions 18. The housing 12 may additionally include a handle 11 extending laterally from one side thereof in order to provide a means by which a user may grip and steady the camera 10 during its picture taking mode of operation. A photographic camera apparatus having the type of housing herein described is generally referred to as a "box-type" camera due primarily to its "box-like" appearance which can be neither collapsed nor folded during periods of non-use.

The single reflex photographic camera herein described is suitable for use with film units described in detail in U.S. Patent to E. H. Land No. 3,415,644 entitled "Novel Photographic Products and Processes". Such film units include all of the materials necessary to produce a positive photographic print by an imaging forming process which is now well-known in the art and which involves formation of transverse image forming substances in an exposed photosensitive element by their diffusion in a manner forming a visual positive image.

The photographic camera 10 includes a film magazine chamber 20 for receipt of a film magazine 26 of the type having a plurality of photosensitive film units 30 of the above-described type. Entrance to film magazine chamber 20 is provided by a movable entrance section 28 through which the film magazine 26 may be inserted in a direction generally orthogonal to the base portion 14. Additionally, each such film magazine 26 is provided with a picture framing aperture 22, not shown in full, but defined in part by longitudinal edge portions 24 of film magazine 26. When the film magazine 26 is properly located within the film magazine chamber 20, picture framing aperture 22 becomes positioned so that it is aligned with the optical system of photographic camera 10 to facilitate exposure operations and picture framing. Within film magazine 26 is a spring assembly 32 that continuously urges the film units 30 toward picture framing aperture 22 so that the outermost unit is located in the focal plane of camera 10 for exposure purposes. An elongated opening, not shown, is provided in the film magazine 26 to facilitate the sequential advancement of each film unit 30 from the magazine towards a fluid processing assembly 34 after an exposure is made. As is readily apparent, fluid processing assembly 34 is stationed within entrance section 28 and moves therewith in order to permit insertion of a film magazine 26 within the film magazine chamber 20. The fluid processing assembly 34 includes a pair of juxtaposed spreader members 56 and 58 urged toward one another by resilient bias means which operate to process and eject individual film units through an ejection slot 35 in a known manner. Spreader members 56 and 58 may be in the form of rollers which are operated by a motor 60 through interconnecting gear train 62.

The photographic camera 10 includes an objective lens assembly 36 which may have a plurality of lens elements displaceably arranged along an optical axis 29 in order to facilitate camera focusing. The camera housing 12 also includes an actuator button 31 together with a shutter assembly 64, not shown in detail, but disclosed within housing 12 and comprising suitable electro-optical-mechanical means for determining and regulating exposure intervals. Shutter assembly 64 additionally includes two co-acting blades (not shown) which slidably ride a track (also not shown) mounted within camera housing 12. The optical system of camera 10 in addition to lens assembly 36 further includes a planar reflex reflecting component 66 to provide a folded light path to the film plane for scene light rays emanating from the scene and passing through the lens elements of lens assembly 36. Reflex member 66 is pivotally disposed with respect to housing 12 by a pair of spaced apart hinge connections 68, 70 which rotate about an axis orthogonal to the base portion 14.

The photographic camera herein described has two basic modes of operation which may be conveniently classified in functional terms as a viewing and focusing mode and an exposing and processing mode. In the viewing and focusing mode, the reflex member 66 is pivoted about hinge connections 68, 70 in a counterclockwise direction so as to overlie a light admitting opening 76 as defined by a transverse interior frame member 78. Reflex member 66 cooperates with a pair of diverging side walls 72, 74 and the housing together with the film magazine 26 to define a light tight chamber 80 which operates to prevent the exposure of the film unit 30 during the viewing and focusing mode of operation.

Camera 10 includes a viewfinder 37 having a reducing lens 38 rotatably connected at 45 to the back side of the reflex component 66 for movement therewith in a manner which operates to station the reducing lens 38 on the optical axis 29 during the exposing mode of operation. Reducing lens 38 may in turn connect to a cam follower 47 which is resiliently biased by means not shown to follow a cam surface shown generally at 49. Therefore during the viewing mode, the scene light rays passing through the lens elements of the objective lens assembly 36 are intercepted and reduced by the reducing lens 38. A focusing screen 40 is provided in fixed relation with respect to the camera housing 12 at a predetermined distance behind the reducing lens 38, wherein the predetermined distance corresponds substantially to the focal length of the reducing lens 38. The focusing screen 40 may comprise a sheet of ground glass mounted in a frame and fixed in the camera housing in such a position that the reducing lens 38 forms a visible image of the scene to be photographed on the ground glass surface. Alternatively, the focusing screen 40 may comprise a curved Fresnal screen which accommodates for any curvature of field resulting from the reducing lens 38. Preferably, focusing screen 40 would also have a power factor associated therewith in order that the focused image be evenly illuminated.

Spaced behind the focusing screen 40 in scene light intercepting relation therewith, is provided a substantially planar reflecting surface 42 which redirects the scene light rays from the focusing screen 40 upward in a direction substantially orthogonal to the camera housing base portion 14. The reflecting surface 42 may be a conventional planar mirror fixedly disposed with respect to the camera housing 12 so as to be in a plane which intersects the base portion 14 at an angle of approximately 45°. A second substantially planar reflecting surface 44 is disposed in spaced apart relation above the reflecting surface 42 so as to intercept the scene light reflected by the surface 42 in order to redirect the scene light in a direction substantially parallel to the base portion 14 in a direction opposite to that of the light rays passing through the lens elements of the objective lens assembly 54. The reflecting surface 44 may again be a conventional planar mirror arranged to lie on a plane which intersects the base portion 14 at an angle of approximately 45°. A third substantially planar reflecting surface 48 is provided in fixed spaced apart relation from the reflecting surface 44 so as to intercept the scene light reflected therefrom and redirect the scene light downwardly in a direction substantially orthogonal to the housing base portion 14. Again the reflecting surface 48 may be a conventional planar mirror arranged such that the plane of the mirror intersects the base portion 14 at an angle of approximately 45°. A pair of erecting lenses 46 may be disposed in scene light intercepting relation between the reflecting surfaces 44 and 48 in order to erect and invert the scene image in a manner as is well known to the optical art. A fourth substantially planar reflecting surface 50 is provided in fixed spaced apart relation with respect to the reflecting surface 48 so as to intercept the scene light reflected therefrom whereupon the scene light is then reflected in a direction substantially parallel to the base portion 14. Reflecting surface 50 may again be a conventional planar mirror fixedly disposed within housing 12 so as to intersect the base portion 14 at an angle of approximately 45°. As is readily apparent, the reflecting surfaces 42 and 48 lie in planes which are arranged to intersect the planes of reflecting surfaces 44 and 50 at angles of approximately 90°.

An eye lens 54 is provided in the camera housing 12 to intercept the scene light rays reflected from the surface 50 in order that a camera user may view the real image of the scene light as reflected by the surfaces 42, 44, 48 and 50 from the focusing screen 40. The imaged scene light as viewed by the camera user through the eye lens 54 appears both erect and non-inverted as a result of the erecting lenses 46. Between the eye lens 54 and reflecting surface 50, there may also be included a field lens 52 in order to better facilitate the camera user's viewing of the imaged scene light.

The hereinabove described arrangement of reflecting and refracting optical elements cooperatively define the viewfinder 37 which provides the camera 10 with a single lens reflex capability thus permitting the camera user to select the subject matter of the scene and subsequently focus the image for best sharpness. Located in the objective lens assembly 36 are means not shown which when rotated by the camera user cause a forward-rearward displacement of the lens elements in lens assembly 36 thereby permitting the user to adjust the sharpness of the scene image. It will be readily appreciated that the optical axis 29 through the objective lens assembly 36 is folded by the reflecting members 42, 44, 48 and 50 to define a planar surface substantially parallel to the film plane and orthogonal to the camera base portion 14. In this manner the viewfinder 37 may be located in side by side relation with respect to the film plane thus taking up a minimum of space within the non-collapsible "box type" camera herein described. It will also be appreciated that the introduction of reducing lens 38 onto the optical axis 29 operates to cause a reduction in the effective focal length for the objective lens assembly 36, thus minimizing the sizes required for reflecting surfaces 42, 44, 48 and 50 so to even further compact the overall size of non-collapsible camera 10. Had not the reducing lens 38 been provided in the above described manner, it would then be necessary to increase the size of each reflecting surface so as to approximate the size of the picture framing aperture 22, thus substantially increasing the overall size required for the camera housing 12.

In order to initiate an exposing and processing mode of operation for camera 10, the user depresses actuator button 31 located in housing 12. The depression of actuator button 31 engages means, not shown, in camera 10 which effect a sequential series of camera system operations that ultimately result in a finished photograph. The first of these operations closes the normally open shutter assembly 64 located in housing 12 thus producing an internal light-tight condition within the camera housing. Subsequently the reflex member 66 moves from its position overlying the light admitting opening 76 in frame member 78 to its position as shown in FIG. 2 thereby uncovering photosensitive film unit 30 in position to direct light rays coming from the focused scene to the film unit 30 instead of the alternate path to the eye. Shutter assembly 64 then reopens and the exposure is begun. After an appropriate exposure interval the shutter assembly 64 again closes and the chamber 80 is again in a light-tight position. At this time reflex member 66 is automatically repositioned to cover the light admitting opening 76 in frame member 78 thus covering chamber 80 and providing a light-tight condition with respect to the exposed film unit. After the reflex member 66 has been returned to cover the light admitting opening 76 shutter assembly 64 is opened thus returning camera 10 to its original viewing and focusing mode of operation.

While reflex member 66 is returning to its initial position covering the light admitting opening 76, a sequence of events is initiated during which the exposed film unit 30 is automatically advanced through the elongated opening of film magazine 26 and into operative relationship with fluid processing assembly 34. After the film unit 30 is exposed and brought into contact with the fluid processing assembly 34, it is continually advanced therethrough and during advancement a compressive force is exerted on the film unit by juxtaposed spreader members 56 and 58 which operate to rupture a container in the film unit and progressively spread the processing fluid within the film assembly. The film unit 30 is thereafter ejected from the slot 35 in the top portion 16 of the camera housing 12 wherein the ejection is in a direction generally away from and orthogonal to the base portion 14. Ejecting the film unit 30 from the top portion 16 of camera housing 12 reduces the risk that an ejecting film unit will be obstructed by the camera user's hand since one hand should always hold the camera handle 11 in order to steady the camera while the other hand depresses the actuator button 31. In this manner, neither hand should overlie the top portion 16 of the camera housing 12 to obstruct the ejection of a film unit.

Figure 4:
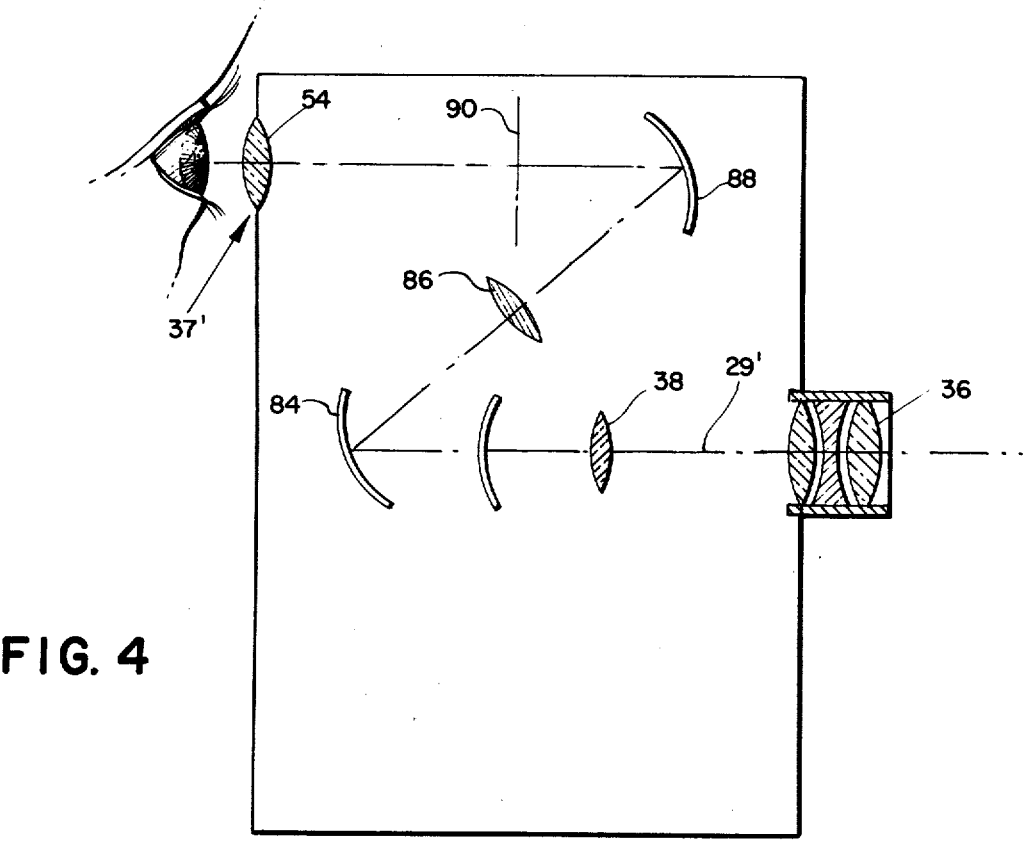
FIG. 4 is a cross-sectional side elevation view for an alternate arrangement of the photographic camera apparatus of FIG. 1.

Referring now to FIG. 4 there is shown at 37' an alternate arrangement for the above described viewfinder wherein an aspheric reflecting surface 84 is fixedly stationed in scene light intercepting relation with respect to the imaged scene light passing through objective lens assembly 36 and reducing lens 38. Scene light reflected from the aspheric surface 84 is thereafter directed through an imaging lens 86 onto a second aspheric surface 88 from whence the scene light rays are thereafter focused to form a real image on a focal plane 90. The real image may thereafter be viewed by the camera user through eye lens 54. The aspheric reflecting surfaces 84 and 88 cooperate as combination field and erecting elements in order to both erect and invert the imaged scene light. Imaging lens 86 is provided in order to compensate for the required power of the aspheric reflecting surfaces 84, 88 thus facilitating a sharper focus of the imaged scene light on focal plane 90. The aspheric reflecting surfaces 84, 88 which may be conventional mirrored surfaces cooperatively function to reduce optical abberations, especially spherical abberation. Also, as is readily apparent, the number of reflecting surfaces required to reflect the scene light rays back to the eye lens 54 may be reduced while still maintaining the same planar orientation for the folded optical axis 29'.

Thus, the herein described camera apparatus 10 provides the functional requirements of a single lens reflex camera having a through the lens viewing and focusing capability as suited for use with film units of the self-developing type. Whereas the camera is of a non-collapsible "box type" it becomes substantially simpler and more economical to manufacture than known collapsible type cameras since articulated components as well as a collapsible bellows have been eliminated. The camera size has been minimized by the unique spatial orientations of the various camera components, as for instance, the viewfinder 37 having a folded optical axis which defines a plane substantially parallel to the film plane. In addition, the reflex component 66 is arranged to pivot about an axis parallel to the film plane and viewfinder plane thus providing a compact side-by-side relationship between the viewfinder, reflex member and film plane. It will also be appreciated that the plane of the viewfinder, film plane and reflex member plane are all arranged substantially orthogonal to the base portion 14 of the camera housing 12 in order to further compact the spatial distances between the various camera components.

Cameras of the above-described type may also be arranged to utilize the artificial illumination of either a cubically packaged multi-lamp flash unit or a linear array of flash lamps generally packaged in two linear rows facing in opposite directions. In order to avoid problems of "red eye", grotesque shadowing, and the like it is preferred that such flash units be positioned a sufficient distance above the objective lens of a camera. Should a flash lamp be positioned such that it is oriented below the objective lens of such a camera, grotesque shadow effects may be witnessed in a resulting image of a human subject. However, as is readily apparent, the housing arrangement for the above-described camera provides a substantially planar and level top portion 16 to accommodate receipt of such flash units at a sufficient distance above the objective lens assembly 36 to avoid the problems of "red eye", grotesque shadowing and the like. The embodiment described herein is illustrative and not restrictive and the scope of invention being indicated by the appended claims and all variations which come within the meaning of the claims are intended to be embraced therein.

What is claimed is:

1. A photographic apparatus of the single lens reflex type comprising:
    a housing,
    objective lens means disposed relative to said housing for admitting scene light into said housing,
    means disposed within said housing for defining a film plane,
    viewing means disposed within said housing for viewing said scene light through said objective lens means wherein the optical axis for said scene light is folded in a manner to define a line of sight residing entirely on a plane substantially parallel to said film plane, and
    reflecting means selectively operative to reflect said scene light into impingement on said film plane.

2. The photographic apparatus of claim 1 wherein:
    said housing is of the non-collapsible type having a base portion, and
    said film plane and viewing means line of sight plane are substantially orthogonal to said base portion.

3. The photographic apparatus of claim 2 having distinct viewing and film exposing modes of operation wherein said reflecting means operates to block a light admitting opening to a light tight chamber thus prohibiting the impingement of scene light onto said film plane during said viewing mode of operation.

4. The photographic apparatus of claim 3 wherein said reflecting means includes a substantially planar reflecting surface arranged to pivot about an axis orthogonal to the base portion and parallel to both the film plane and the plane defined by the viewing means line of sight.

5. The photographic apparatus of claim 3 wherein said viewing means includes:
- a first planar reflecting surface in scene light intercepting relation with respect to scene light passing through said objective lens means in order to reflect said scene light in a direction substantially orthogonal to said base portion and parallel to said film plane;
- a second planar reflecting surface in scene light intercepting relation with respect to the scene light reflected from said first reflecting surface so as to redirect said scene light in a direction substantially parallel with said base portion and said film plane;
- a third planar reflecting surface in scene light intercepting relation with respect to the scene light reflected from said second reflecting surface so as to redirect said scene light in a direction substantially orthogonal to said base portion and parallel to said film plane;
- a fourth planar reflecting surface in scene light intercepting relation with respect to the scene light reflected from said third reflecting surface so as to redirect said scene light in a direction substantially parallel to the base portion and film plane;
- eye lens means in scene light intercepting relation with respect to the scene light reflected from said fourth reflecting surface, and
- erecting lens means disposed in scene light intercepting relation along the optical axis of said viewing means for inverting and reversing the imaged scene light as viewed through the eye lens.

6. The photographic apparatus of claim 4 wherein said viewing means further includes:
- a reducing lens means movable with said reflecting means to directly intercept scene light passing through the objective lens means when said photographic apparatus is in the viewing mode, and
- a focusing screen positioned with respect to the reducing lens such that a real image of the scene light is formed on the focusing screen surface.

7. The photographic apparatus of claim 3 wherein said viewing means includes:
- a first aspheric reflecting surface in scene light intercepting relation with respect to scene light passing through said objective lens in order to reflect said scene light in a direction oblique to said base portion and parallel to said film plane,
- a second aspheric reflecting surface in scene light intercepting relation with respect to scene light reflected from said first aspheric reflecting surface in order to reflect said scene light in a direction parallel to said base portion and film plane,
- an imaging lens disposed in scene light intercepting relation intermediate said first and second aspheric reflecting surfaces in order to focus the imaged scene light along the focal plane of said aspheric mirrors, and
- eye lens means in scene light intercepting relation with respect to the scene light reflected from the second aspheric mirror to facilitate viewing of the imaged scene light along the focal plane of said aspheric mirrors.

8. The photographic apparatus of claim 7 wherein said viewing means further includes:
- a reducing lens means movable with said reflecting means to directly intercept scene light passing through the objective lens when said photographic apparatus is in the viewing mode, and
- a focusing screen positioned with respect to the reducing lens such that a real image of the scene light is formed on the focusing screen surface.

9. The photographic apparatus of claim 3 wherein said viewing means includes:
- a reducing lens means movable with said reflecting means to directly intercept scene light passing through the objective lens when said photographic apparatus is in the viewing mode,
- a focusing screen positioned with respect to the reducing lens such that a real image of the scene light is formed on the focusing screen surface,
- eye lens means for viewing said real image, and
- means for directing scene light from the real image to the eye lens means through a folded optical path which remains parallel to said film plane.

10. The photographic apparatus of claim 1 including:
- a base portion,
- a film magazine receiving chamber for receiving a film magazine of the type containing a plurality of self developing film units, and
- a fluid processing station for selectively processing and ejecting individual film units in a direction parallel to the film plane and away from the base portion.

11. A photographic apparatus comprising:
- a housing having a substantially planar base portion,
- objective lens means disposed relative to said housing for admitting scene light into said housing wherein said admitted scene light is centered about an optical axis through said objective lens means,
- viewing means disposed within said housing,
- means disposed within said housing for defining a film plane substantially orthogonal to said base portion and substantially parallel to said optical axis, and
- reflecting means selectively pivotable to reflect said scene light into impingement on said film plane when said camera is in a film exposure mode of operation.

12. The photographic apparatus of claim 11 wherein said viewing means provides for viewing said scene light through said objective lens in order to provide said apparatus with a single lens reflex capability.

13. The photographic apparatus of claim 12 having distinct viewing and film exposing modes of operation wherein said reflecting means includes a first substantially planar reflecting surface which may be pivoted about an axis orthogonal to said base portion during the film exposing mode of operation to intersect the optical axis at an angle of approximately 45°.

14. The photographic apparatus of claim 13 having a non-collapsible housing wherein said viewing means includes:
- a reducing lens means movable with said reflecting means to directly intercept scene light passing through the objective lens when said photographic apparatus is in the viewing mode,
- a focusing screen positioned with respect to the reducing lens such that a real image of the scene to be photographed is formed on the focusing screen surface,
- eye lens means for viewing said real image, and means for directing scene light from the focusing screen to the eye lens means.

15. The photographic apparatus of claim 14 wherein said means for directing scene light from the focusing screen to the eye lens means includes:
   a first planar reflecting surface in scene light intercepting relation with respect to scene light received from said focusing screen,
   a second planar reflecting surface in scene light intercepting relation with respect to scene light reflected from the second reflecting surface,
   a third planar reflecting surface in scene light intercepting relation with respect to scene light reflected from the third reflecting surface, and
   a fourth planar reflecting surface in scene light intercepting relation with respect to scene light reflected from the fourth reflecting surface whereby said scene light is ultimately redirected in a direction to intercept said eye lens means.

16. The photographic apparatus of claim 14 wherein said means for directing scene light from the focusing screen to the eye lens means includes:
   a first aspheric reflecting surface in scene light intercepting relation with respect to scene light received from said focusing screen,
   a second aspheric reflecting surface in scene light intercepting relation with respect to scene light reflected from said first aspheric reflecting surface wherein said scene light is ultimately redirected in a direction to intercept said eye lens means, and
   an imaging lens disposed in scene light intercepting relation intermediate said first and second aspheric reflecting surface in order to focus the imaged scene light along the focal plane of said aspheric mirrors.

17. The photographic apparatus of claim 13 including a film magazine receiving chamber for receiving a film magazine in a direction orthogonal to the base portion, said magazine being of the type containing a plurality of self-developing film units, and
   a fluid processing station for selectively processing and ejecting individual film units in a direction parallel to the film plane and orthogonal to the base portion.

18. A photographic apparatus for use with film units of the self-developing type having a rupturable container adjacent one edge thereof, comprising:
   a housing having a base portion defining a base plane, and a top portion disposed in spaced apart relation relative to said base portion;
   objective lens means disposed relative to said housing for admitting scene light into said housing wherein said admitted scene light is centered about the optical axis of said objective lens means, said optical axis being substantially parallel to said base plane;
   means disposed within said housing for defining a film plane substantially orthogonal to said base plane, said film plane accommodating the stationing of a film unit thereon so that the rupturable container adjoins that edge of the film unit furthest from said base portion;
   reflecting means disposed within said housing to direct said scene light into impingement on said film plane when said camera is in a film exposure mode of operation so that the bottom of a scene image recorded on the film unit stationed on said film plane is adjacent the rupturable container;
   a fluid processing station for selectively processing the film units as the film units are transported through said processing station in a direction substantially parallel to the film plane and orthogonal to said base plane, said processing station being located adjacent the rupturable container edge of the film unit disposed in said film plane; and
   means located adjacent said processing station for accommodating ejection of said film units from the top portion of said housing in a direction substantially parallel to the film plane and orthogonal to said base plane.

19. The photographic apparatus of claim 18 wherein the means for accommodating ejection of said film units includes a slotted opening in the top portion of said housing through which the film units may be ejected in a direction away from said base plane.

* * * * *